United States Patent [19]
Saunders et al.

[11] Patent Number: 5,918,172
[45] Date of Patent: Jun. 29, 1999

[54] MULTIPLE NUMBER ASSIGNMENT MODULE COMMUNICATION

[75] Inventors: William C. Saunders; Gordon D. Quick, both of Dallas; Thomas D. Russell, Plano, all of Tex.

[73] Assignee: HighwayMaster Communications, Inc., Dallas, Tex.

[21] Appl. No.: 08/721,912

[22] Filed: Sep. 27, 1996

[51] Int. Cl.⁶ ...................................................... H04Q 7/22
[52] U.S. Cl. ........................ 455/404; 455/414; 455/419; 455/435; 455/552; 455/557
[58] Field of Search .................................. 455/404, 414, 455/419, 420, 435, 551, 552, 556, 557, 31.1, 66

[56] References Cited

U.S. PATENT DOCUMENTS

| | | | |
|---|---|---|---|
| 4,677,653 | 6/1987 | Weiner et al. | 455/551 |
| 4,734,928 | 3/1988 | Weiner et al. | 455/551 |
| 4,833,702 | 5/1989 | Shitara et al. | 455/465 |
| 5,020,091 | 5/1991 | Krolopp et al. | 455/551 |
| 5,101,500 | 3/1992 | Marui | 455/32.1 |
| 5,263,078 | 11/1993 | Takahashi et al. | 455/557 |
| 5,297,192 | 3/1994 | Gerszberg | 455/419 |
| 5,410,739 | 4/1995 | Hart | 455/66 |
| 5,428,665 | 6/1995 | Lantto | 455/414 |
| 5,428,666 | 6/1995 | Fyfe et al. | 455/551 |
| 5,437,053 | 7/1995 | Sawa et al. | 455/551 |
| 5,442,806 | 8/1995 | Barber et al. | 455/435 |
| 5,530,736 | 6/1996 | Comer et al. | 455/458 |
| 5,537,415 | 7/1996 | Miller et al. | 455/31.1 |
| 5,572,571 | 11/1996 | Shirai | 455/551 |

*Primary Examiner*—Andrew M. Dolinar
*Attorney, Agent, or Firm*—Baker & Botts, L.L.P.

[57] ABSTRACT

A communication system (10) includes a communication device (12) that supports communication using multiple number identification modules (70–74). Each NAM (70–74) supported by the communication device (12) is associated with a network (14,16) that provides a voice service or an enhanced service to the communication device (12). For outbound communication, the communication device (12) selects the appropriate NAM (70–74) in response to a request for a particular service. For inbound communication, the communication device (12) registers more than one NAM (70–74) to be able to respond to incoming pages from the networks (14, 16).

51 Claims, 5 Drawing Sheets

| | MIN | SID | VOICE SERVICE | ENHANCED SERVICE | ENHANCED SERVICE | ENHANCED SERVICE | AUTO REGISTER |
|---|---|---|---|---|---|---|---|
| NAM1 | 099-881-1234 | 044 | LONG DISTANCE | EMERGENCY | STOLEN VEHICLE | – | N |
| NAM2 | 214-555-1234 | 392 ~~3912~~ | LOCAL DALLAS | – | – | – | Y |
| NAM3 | 617-555-4326 | 488 | LOCAL BOSTON | – | – | – | Y |
| NAM4 | 099-881-4328 | 064 | – | DISPATCH | ENGINE MONITOR | BROKER | A/B |
| NAM5 | – | – | – | – | – | – | – |

FIG. 2

MULTIPLE NUMBER ASSIGNMENT MODULE COMMUNICATION

TECHNICAL FIELD OF THE INVENTION

This invention relates in general to communication systems and methods, and more particularly to multiple number assignment module communication.

BACKGROUND OF THE INVENTION

Communication systems offer a variety of services to customers. Most telecommunication systems offer local or long distance voice service, and many now offer enhanced services that may include voice, data, or a combination of voice and data. For example, enhanced services through a telecommunication system may include emergency services, locating services, various brokering and dispatching services for trucking companies, or any other suitable enhanced service that is offered beyond traditional voice communication.

In the mobile communication environment, a variety of providers and networks may offer a variety of voice and enhanced services. One service provider may offer competitive and reliable voice service, while another provider may offer particular enhanced services suited to the needs of the customer. Also, customers may purchase and operate different equipment to provide the services they need. Existing communication technology and the lack of cooperation among different providers and networks prevents the integration and delivery of a variety of voice and enhanced services at a reasonable cost and complexity.

SUMMARY OF THE INVENTION

In accordance with the present invention, the disadvantages and problems associated with providing voice and enhanced services have been substantially reduced or eliminated. In particular, multiple number assignment module communication provides an integrated and efficient technique to deliver a variety of voice and enhanced services to customers.

In accordance with one embodiment of the present invention, a communication device includes an input device that generates a request specifying one of an enhanced service and a voice service. A memory stores a first number assignment module associated with the enhanced service and a second number assignment module associated with the voice service. A processor coupled to the input device selects the first number assignment module if the request specifies the enhanced service or the second number assignment module if the request specifies a voice service. A transceiver coupled to the memory provides the requested service using the selected number assignment module.

In accordance with another aspect of the present invention, a device for communicating with a first cellular network and a second cellular network includes a memory that stores a first number assignment module and a second number assignment module. A transceiver registers the first number assignment module with the first cellular network and the second number assignment module with the second cellular network such that the first number assignment module and the second number assignment module are concurrently registered with their respective cellular networks. The transceiver receives a page, and a processor activates for communication one of the first number assignment module and the second number assignment module specified by the page.

Important technical advantages of the present invention include a communication device that supports communication using multiple number assignment modules (NAMs). Each NAM supported by the communication device is associated with one or more voice services or enhanced services. Voice services include local telephone service and long distance telephone service. Enhanced services include emergency services, locating services, trucker broker and dispatching services, roadside assistance, information services, door unlocking, and other enhanced services. For outbound communication, the communication device selects the appropriate NAM depending on the requested service. For inbound communication, the communication device registers multiple NAMs to support services from multiple communication networks. This provides the flexibility of offering different services from different communication networks in a consistent and integrated fashion. Further technical advantages include providing sensors and actuators at the communication device to facilitate the provisioning of enhanced services.

BRIEF DESCRIPTION OF THE DRAWINGS

For a more complete understanding of the present invention, and for further features and advantages, reference is now made to the following description taken in conjunction with the accompanying drawings, in which:

FIG. 2 illustrates a table relating number assignment modules to voice and enhanced services;

DETAILED DESCRIPTION OF THE INVENTION

Figure 1:
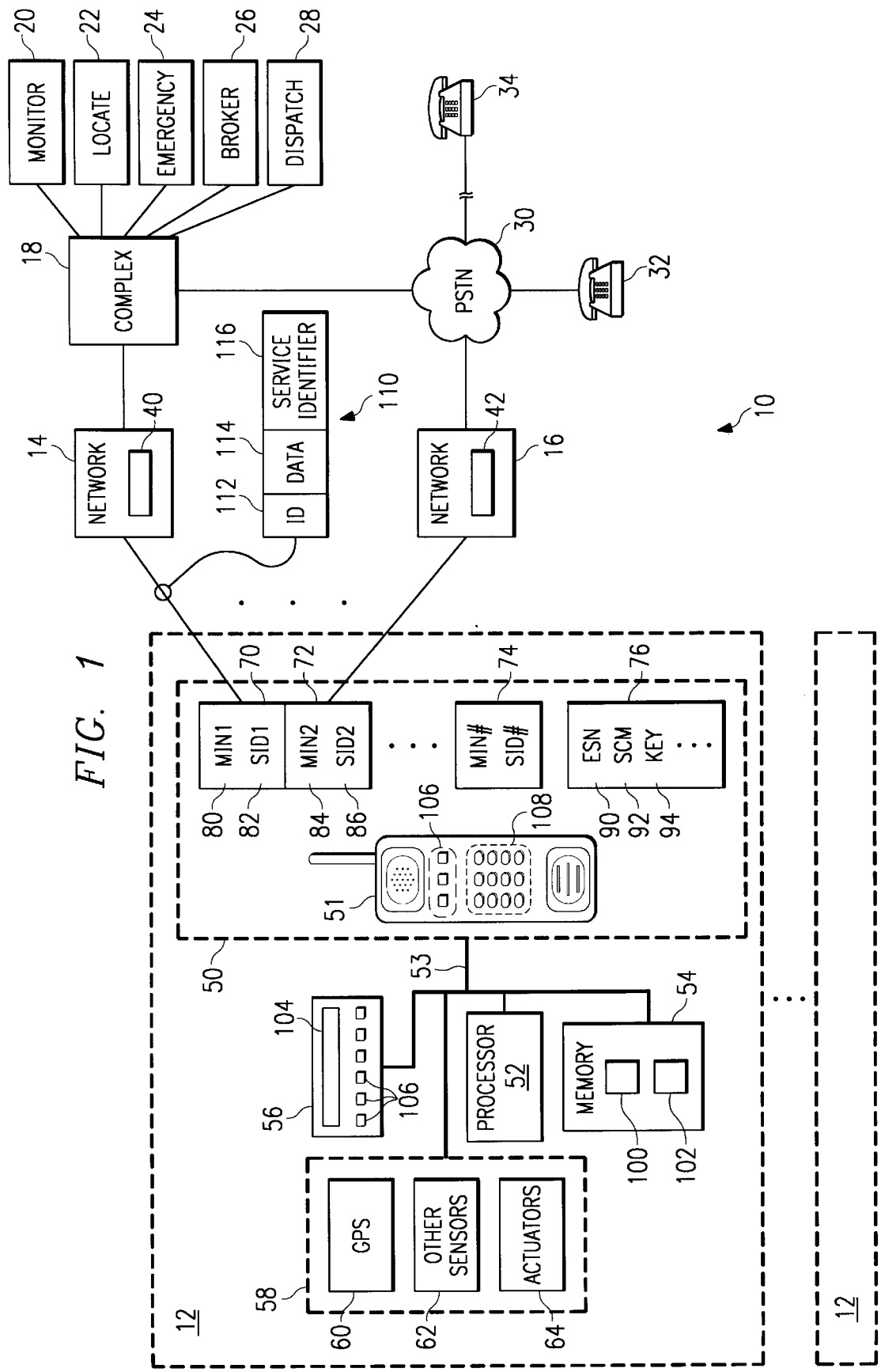
FIG. 1 illustrates a communication system that includes a communication device that supports multiple number assignment modules.

FIG. 1 illustrates a communication system 10 that provides both voice services and enhanced services to a plurality of communication devices 12. Voice services include traditional local and long distance voice communication that, in the specific context of cellular telephone service, may also include roamer and other call delivery services. Enhanced services include those services beyond traditional voice service, such as emergency services, locating services, brokering and dispatching services for trucking companies, roadside assistance, information services, door unlocking, or other enhanced services that provide data communication as a component of the service.

Communication device 12 is coupled to a first network 14. First network 14 is coupled to complex 18, which is in turn coupled to a number of enhanced service modules 20–28, including a monitor module 20, a locate module 22, an emergency module 24, a broker module 26, and a dispatch module 28. Complex 18 and/or enhanced service modules 20–28 deliver enhanced services to communication device 12. Complex 18 may provide a variety of voice and data services, as described in U.S. Pat. No. 5,544,225 entitled "Data Messaging in a Cellular Communications Network," which is herein incorporated by reference for all purposes. As described in this patent, complex 18 provides vehicle locating, call delivery, data messaging, billing, usage tracking, and a variety of other services to communication device 12.

In one embodiment, complex 18 provides the processing and data storage capabilities to deliver these services. However, the invention contemplates the provisioning of additional enhanced services using one or more enhanced service modules 20–28. These modules provide the flexibility and modularity to deliver enhanced services through complex 18 and first network 14 at a reduced cost and complexity. In addition, different companies may operate enhanced modules 20–28 to provide these enhanced services.

An engine or trailer manufacturer operates monitor module 20 that provides engine and trailer performance monitoring to communication device 12. Monitor module 20 retrieves engine performance information from a vehicle associated with communication device 12 and provides information or commands to control certain aspects of the engine operation. Using a vehicle's onboard computer, monitor module 20 can respond to vehicle information and generate messages alerting the drive or dealer of a potential problem.

Locate module 22 maintains a variety of maps, directions, and other geographical information to track, locate, provide directions to, or otherwise provide geographical services to communication device 12. Locate module 12 can provide directions, update previous directions when the user is lost, provide return directions to the origination point, and even maintain a database of the most frequently traveled destinations. In a particular embodiment, locate module 22 provides a location fix of communication device 12 in response to a user request.

Emergency module 24, coupled to police, fire, security, or other organizations or personnel, provides emergency and security services to persons or vehicles associated with communication device 12. For example, module 24 may automatically alert the authorities in the event of a vehicle theft, and provide a location update and tracking information to aid in vehicle recovery. Emergency module 24 may also summon medical personnel in the event of a medical emergency, and may maintain a database of relevant medical information on the user of communication device 12. In a particular embodiment, communication device 12 includes sensors that monitor the medical condition of the user and may initiate communication to emergency module 24 in response to suspect sensor readings. For roadside assistance, emergency module 24 can receive a precise vehicle location and previous travel direction, as well as the color, make, model, and license number of the vehicle, to more effectively dispatch personnel for assistance. In dispatching a variety of services, emergency module 24 may send a confirmation to communication device 12 and a time of arrival estimate.

Emergency module 24 provides other remote security features using actuators coupled to communication device 12. For example, if a user locks the keys inside a vehicle equipped with communication device 12, the user can place a telephone call to emergency module 24 and enter a personal identification number (PIN). In response, emergency module 24 communicates a message to communication device 12 that causes an actuator in the vehicle to unlock the doors. Other actuator data generated by emergency module 24 and communicated to communication device 12 may be used to immobilize a vehicle, sound an alarm, or perform any function remotely using an appropriate actuator coupled to communication device 12.

Broker module 26 and dispatch module 28 provide load brokering and dispatch services for trucks, taxis, barges, delivery trucks, or other vehicles associated with communication device 12. For example, broker module 26 may provide load information to long-haul and less-than-local (LTL) fleets. Dispatch module 28 may be operated by a trucking service, taxi service, or other service that desires to manage, route, track, and provide enhanced services to a fleet of vehicles.

Communication device 12 is also coupled to a second network 16. A public switched telephone network (PSTN) 30 coupled to second network 16 provides communication between communication device 12 and a local party 32 or a long distance party 34. In addition, complex 18 may also be coupled to PSTN 30 to provide various calling services through first network 14, as described in U.S. Pat. No. 5,544,225.

Networks 14 and 16 represent a collection of components of one or more appropriate mobile communication networks, such as a cellular communication network. For example, networks 14 and 16 include the various cell sites, mobile telephone switching offices (MTSOs), network controllers, trunk lines, and other equipment to provide mobile communication to communication device 12.

Networks 14 and 16 are depicted as separate components in FIG. 1 for convenience and illustrative purposes, but the present invention contemplates networks 14 and 16 as the same or different networks. For example, communication device 12 may be served by a network cell site or other equipment operated by a particular service provider. As described below, this cell site supports signaling, paging, ordering, or data or voice communication by communication device 12 using different number assignment modules (NAMs). The network associated with the cell site may be the home system for a first NAM, a visiting or roamed system for one or more additional NAMs, or a cooperating system for yet another NAM associated with a nation-wide cellular service, as described in more detail below. The network and communication device 12 supports communication using each of these NAMs. In another embodiment, networks 14 and 16 may be different systems operated by different service providers. For example, network 14 may be associated with the A side cellular service provider and network 16 may be associated with the B side cellular service provider. As described below, communication device 12 may incorporate frequency agile techniques or multiple channel operation to communicate on either the A or B side cellular service.

Networks 14 and 16 maintain a class of service 40 and 42, respectively, for communication device 12. In one embodiment, class of service 40 maintained by first network 14 directs all outgoing calls from communication device 12 to complex 18. In a similar fashion, class of service 42 maintained by second cellular network 16 may allow outgoing calls from communication device 12 to local party 32 but not long distance party 34. The present invention contemplates any appropriate classes of service 40 and 42 given the security, fraud prevention, billing, and other customer considerations in communication system 10.

Communication device 12 includes a cellular transceiver 50 coupled to a processor 52, a memory 54, an input/output device 56, and external devices 58 using bus 53. In a particular embodiment, transceiver 50 comprises a traditional cellular transceiver that complies with existing cellular communication protocols, such as the EIA/TIA-553 specification, revision A, with certain specific modifications.

These modifications include multiple NAM registration control and the ability to enable or disable autonomous registration. Also, transceiver 50 in system 10 supports inbound communication by responding to pages directed to multiple NAMs, as well as outbound communication using one of a selected number of NAMs depending on the desired voice or enhanced service. Transceiver 50 may also support remote programming of NAM information.

In the embodiment in which networks 14 and 16 are different systems, transceiver 50 may include additional functionality to communicate with the different systems. For example, transceiver 50 may include frequency agile circuitry or other components to allow switched operation between an A side and B side cellular service, or any other available mobile communication systems. This is important for a selective A/B registration technique described below, but also allows transceiver 50 to receive pages and orders, respond, and establish voice or data communication on two or more different systems operating at different frequencies. Also, transceiver 50 may support simultaneous multiple channel communication using multiple transmit and receive channels. For example, a user of communication device 12 may receive voice service over network 14 using a first channel and simultaneously receive an enhanced service over network 12 using a second channel.

External devices 58 may include a global positioning satellite (GPS) device 60 that generates information on the geographic location of communication device 12. Other sensors 62 may include engine monitors, trailer monitors, personal medical monitors, airbag deployment sensors, accelerometers, or other sensors that generate sensor data associated with an enhanced service in system 10. Actuators 64 may include security alarm devices, door lock/unlock devices, engine cutoff devices, or any other actuators that can receive actuator data associated with an enhanced service in system 10.

Cellular transceiver 50 includes components to communicate with first cellular network 14 and second cellular network 16. These components include a handset 51 with associated transmit and receive circuitry, as well as a program memory to store data and instructions for operation. For example, program memory may store a plurality of number assignment modules (NAMs) 70–74, a personality module 76, and other instructions to direct the operation of transceiver 50. NAM 70 includes a first mobile identification number (MIN1) 80 and a first system identification number (SID1) 82 associated with first network 14. Similarly, NAM 72 includes a second mobile identification number (MIN2) 84 and a second system identification number (SID2) 86 associated with second network 16. Any number of additional NAMs 74 may include additional mobile identification numbers and system identification numbers associated with first network 14, second network 16, or other networks in communication system 10.

Personality module 76 includes information about cellular transceiver 50 that is fixed and not subject to modification or reprogramming. This may include an electronic serial number (ESN) 90, a station class mark (SCM) 92, an authentication key 94, and other parameters common to NAMs 70–74 in transceiver 50.

Processor 52 may be integral to or separate from transceiver 50 or handset 51 and controls the operation of communication device 12. Memory 54 comprises one or more components of random access memory (RAM), read only memory (ROM), erasable programmable read only memory (EPROM), other magnetic or optical storage media, or any other volatile or nonvolatile memory that is either separate from or integral to components of transceiver 50 or handset 51, including program memory. In a particular embodiment, NAMS 70–74 and personality module 76 are maintained in a non-volatile memory, such as EPROM 100 in memory 54. Upon power-up initialization, communication device 12 loads information stored in EPROM 100 into a volatile memory, such as program memory of transceiver 50, for operation. Memory 54 also stores table 102 that contains information relating NAMs 70–74 with the various voice services and enhanced services provided in system 10. Memory 54 also maintains other data and program instructions used by processor 52 to direct the operation of communication device 12.

Input/output device 56 includes a display 104 and a variety of service buttons 106. In a particular embodiment, input/output device 56 is a separate component from cellular transceiver 50 and provides additional interfacing and functionality to the user of communication device 12. In addition to service buttons 106 and numeric telephone keypad 108 on handset 51, input/output device 56 provides additional service buttons 106. A user of communication device 12 may activate a service button 106 in response to a menu item presented on display 104 of input/output device 56. Either using service buttons 106 or keypad 108, the user of communication device 12 can specify a desired voice service or enhanced service.

In operation, communication device 12 provides both outbound and inbound communication to provide voice and enhanced services in system 10. For outbound communication, an input device associated with communication device 12, such as service buttons 106 or keypad 108, generates a request specifying an enhanced service or a voice service. For example, a dialed telephone number on keypad 108 represents a request for local or long distance voice service, whereas the activation of a particular service button 106 represents a request for a particular enhanced service. In response to this request, processor 52 accesses information in table 102 stored in memory 54 to determine the appropriate NAM 70–74 associated with the selected service. Transceiver 50 then provides the requested service using the selected NAM 70–74. For example, if the selected service is a local telephone call, transceiver 50 selects NAM 72 associated with second network 16 to place a telephone call to local party 32 using PSTN 30. However, if the selected service is an enhanced service associated with complex 18, transceiver 50 selects NAM 70 to communicate with first cellular network 14, complex 18, and any appropriate enhanced module 20–28.

Transceiver 50 may transmit a service message 110 to complex 18 using a control channel, paging channel, seized voice channel, or other appropriate link. This service message 110 includes an identifier 112 for communication device 12, transceiver 50, or handset 51, data 114 to support the enhanced service, and service identifier 116 that identifies the enhanced service requested by communication device 12. For example, a user of communication device 12 activates service button 106 associated with emergency module 24. In response, transceiver 50 generates service message 110 that includes its identifier 112 such as MIN1 80 or ESN 90, position data 114 generated by GPS 60, and service identifier 116 identifying the specific service requested from emergency module 24. The position data 114 may then be used by emergency module 24 to dispatch personnel or equipment to the location of communication device 12. Similarly, activation of service button 106 associated with broker module 26 or dispatch 28 may result in the generation and transmission of service message 110 that includes information associated with brokering and dispatching services.

Long distance voice service may be provided through first network 14 and complex 18 or through second network 16. In a particular embodiment, first network 14 and complex 18 support a specific call delivery service, as described in U.S. Pat. No. 5,544,225. In this embodiment, a user of communication device 12 dials a long distance telephone number on keypad 108. In response, cellular transceiver 50 generates service message 110 that includes its identifier 112, the dialed digits and other connection information as data 114, and service identifier 116 identifying the long distance voice service supported by complex 18. Using this information, complex 18 may place a call to long distance party 34 using PSTN 30. Alternatively, cellular transceiver 50 may select NAM 72 in response to the long distance dialed digits, and place a call in a traditional manner to long distance party 34 using second network 16 and PSTN 30. The selection of either first network 14 or second network 16 to place a long distance voice call depends on NAMs 70–74 supported by communication device 12 and their related voice and enhanced services, as indicated in table 102 stored in memory 54.

For inbound communication, cellular transceiver 50 registers multiple NAMs 70–74 to await a page from networks 14 and 16. The page comprises any paging message, control message, or other information transmitted by networks 14 and 16 to communication device 12. One important technical advantage of the present invention is that NAMs 70–74 are concurrently registered with their respective networks 14 and 16 so that they can respond to a variety of incoming pages associated with different NAMs 70–74 that support a variety of voice and enhanced services. Upon receipt of a page, processor 52 activates the appropriate NAM 70–74 identified by the page. Transceiver 50 then responds to the page and provides the voice or enhanced service to communication device 12.

For example, transceiver 50 may receive an incoming page from first network 14 that originated from dispatch module 28. In response, transceiver 50 activates NAM 70, responds to the page, and receives communication from dispatch module 28. In a particular embodiment, a similar service message 110 may be transmitted from complex 18 or enhanced service modules 20–28 to communication device 12. For example, emergency module 24 may initiate a page issued by first network 14. In response, cell transceiver 50 activates NAM 70 and responds to the page. First network 14 then communicates service message 110 to communication device 12, which includes an identifier 112 of communication device 12, data 114 that specifies a code or command to unlock the doors of a vehicle associated with communication device 12, and service identifier 116 indicating the emergency service generated and delivered by emergency module 24.

Since communication device 12 concurrently registers multiple NAMs 70–74 with networks 14 and 16, enhanced roaming capabilities are possible. Assume communication device 12 moves from a home service area to a roaming service area. Typically, any calls made from the roaming service area using a NAM associated with the home service area would incur additional roamer fees. Therefore, communication device 50 registers an additional NAM 74 that provides local telephone service in the roaming service area without incurring additional roaming fees. However, since communication device 12 supports concurrent registration of multiple NAMs, NAM 72 associated with the home service area may still be registered as a roamer in the roaming service area to receive calls placed to communication device 12. Therefore, communication device 12 can reduce roamer fees by maintaining a number of local NAMs for outbound calls, but can also register as a roamer to ensure that it receives all inbound communication to communication device 12.

FIG. 2 illustrates the contents of table 102 that relates NAMs 70–74 to the various voice services and enhanced services provided by system 10. All or a portion of table 102 may be stored in memory 54, program memory of transceiver 50 or handset 51, or in any other location in communication device 12. Each NAM listed in table 102 has an associated mobile identification number (MIN) 200, a system identification number (SID) 202, one or more voice service identifiers 204, and one or more enhanced service identifiers 206. In addition, an auto register identifier 208 includes information on whether and how a NAM listed in table 102 should register with its associated network.

Entry 210 for NAM1 specifies a MIN 200 (099-881-1234) and SID 202 (144) associated with first network 14, that in a particular embodiment represents a cooperating system that supports nation-wide cellular service, as described in detail in U.S. Pat. No. 5,544,225. As shown in columns 204 and 206, NAM1 provides long distance voice service, as well as emergency and stolen vehicle enhanced services using complex 18 and enhanced service modules 20–28, if appropriate. The autonomous registration procedures for NAM1, such as those procedures specified in the emerging EIA/TIA 553 and IS-41 protocol, are disabled as indicated by auto register identifier 208 (N).

Entry 212 specifies information on NAM2 associated with second network 16. Specifically, MIN 200 (214-555-1234), SID 202 (391), and voice service identifier 204 (local Dallas) indicate that NAM2 may be selected to provide local voice service while communication device 12 resides in Dallas, Tex. Autonomous registration for NAM2 is enabled, as indicated by auto register identifier 208 (Y). In a similar fashion, entry 214 specifies information on NAM3, which is associated with local voice service in Boston, Mass.

Entry 216 for NAM4 contains similar information as entry 210, but does not specify an available voice service and includes dispatching, engine monitoring, and brokering enhanced services associated with NAM4. Also, autonomous registration for NAM4 is enabled in a specific fashion to accommodate selective registration, as indicated by auto register identifier 208 (A/B). In a specific embodiment, communication device 12 resides in an area serviced by an A side and a B side cellular service provider. An auto register identifier 208 specifying "A/B" indicates that communication device 12 can query both the A and B side before allowing registration.

Entry 218 for NAM5 represents the capability of communication device 12 to receive a remote program request with information on NAM5 that adds new voice or enhanced services capabilities to communication device 12. As described below with respect to FIG. 5, this remote program capability can modify the information contained in table 102 in any desired fashion.

Communication device 12 accesses table 102 stored in memory 54 for both outbound and inbound communication. For outbound communication, communication device 12 associates a request for communication with a selected voice service identifier 204 or enhanced service identifier 206 in table 102, and selects the corresponding NAM. For example, activation of service button 106 on input/output device 56 requests emergency service, so communication device 12 accesses table 102, determines emergency services are associated with NAM1 as shown in entry 210, and selects NAM1 for communication. As described above, voice service identifiers 204 and enhanced service identifiers 206 may be associated or related to service buttons 106 on input/output device 56 or handset 51, keypad 108, or other automatically initiated services at communication device 12 that do not require operator intervention.

For inbound communication, communication device 12 accesses auto register identifier 208 to determine the appropriate registration procedure for each NAM. After registering NAMs, communication device 12 receives a page and accesses table 102 to determine if one of the listed MINs 200 matches information contained in the received page. If a match is found, communication device 12 activates the NAM with the matching MIN and responds to the page. Depending on the activated NAM and its associated voice or enhanced service, communication device 12 automatically executes the appropriate steps to provide communication. For example, if the incoming page and activated NAM are associated with a voice service, communication device 12 rings transceiver 50. If the incoming page and activated NAM are associated with an enhanced service, communication device 12 establishes data communication, transmits/receives data, displays data, reads sensor data, generates or communicates actuator data, or performs any other suitable task in accordance with the particular enhanced service.

Figure 3A:
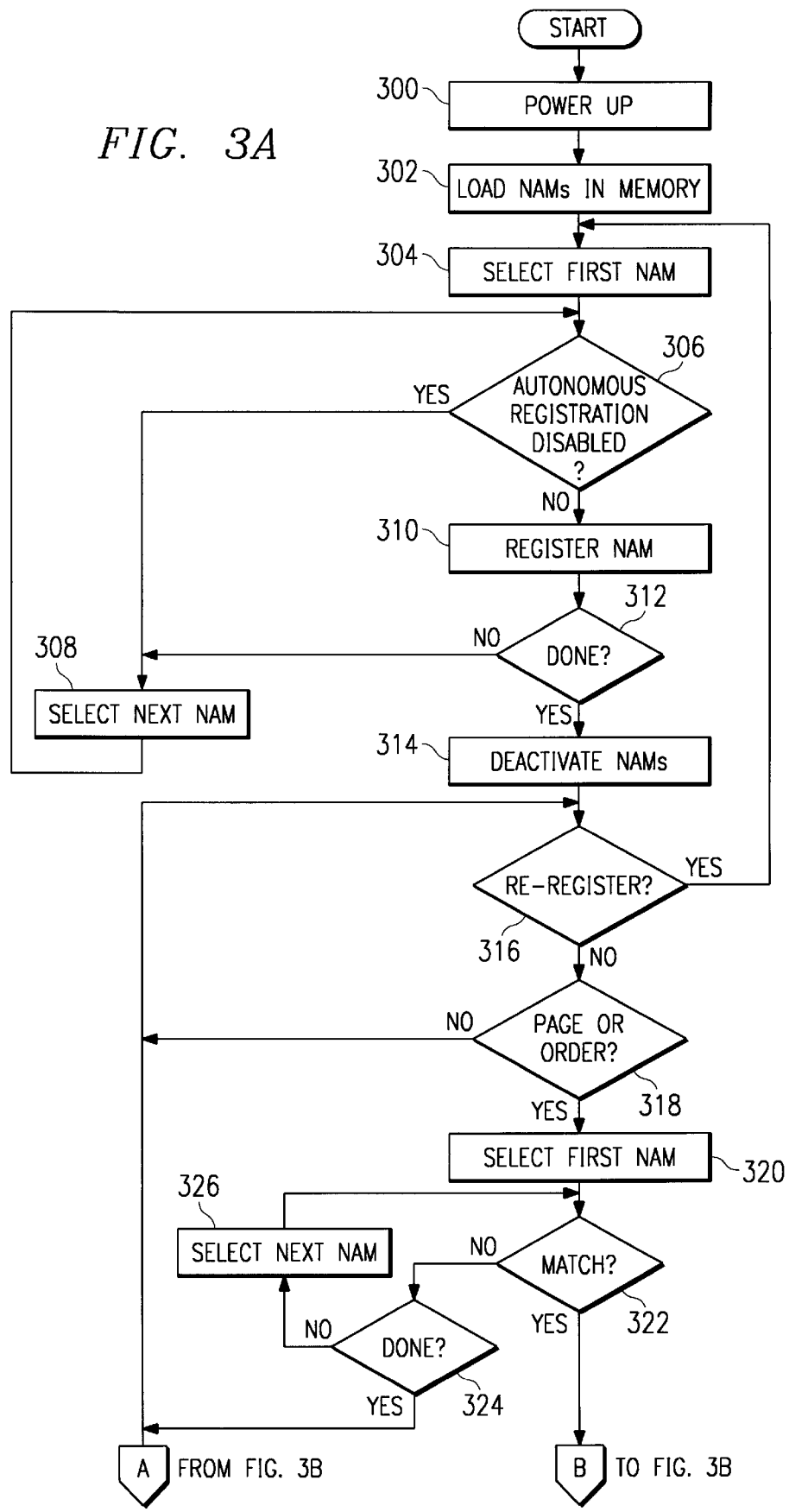
FIGS. 3A and 3B illustrate a flow chart of a method for inbound communication using the communication device of FIG. 1.
Figure 3B:
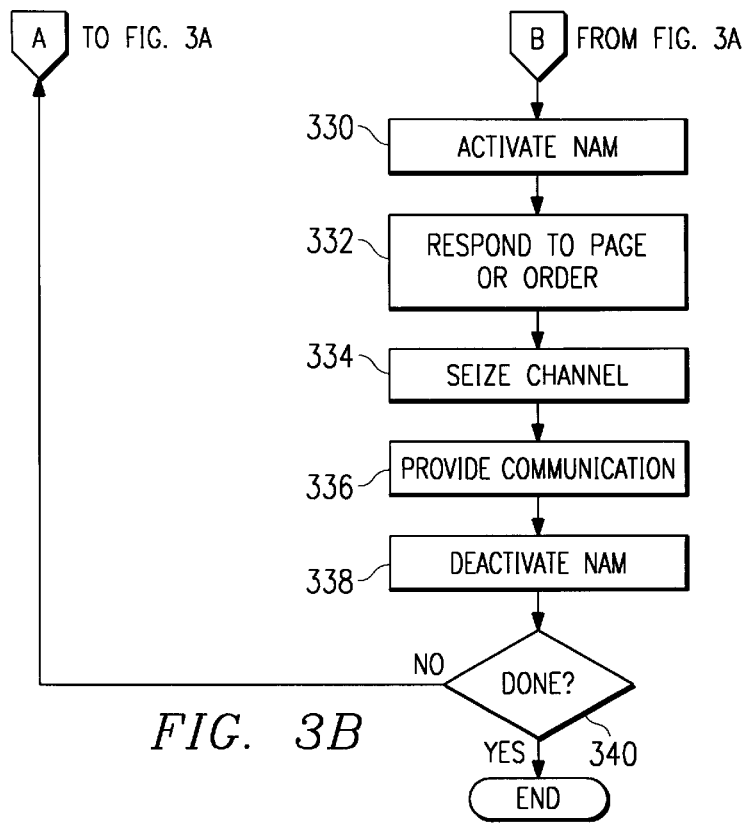

FIGS. 3A and 3B illustrate a flow chart of a method for inbound communication using communication device 12. The method begins at step 300 where communication device 12 powers-up in response to a user request, a command generated by an associated vehicle or equipment, a remote wake-up message, or other appropriate message or command to initiate operation of communication device 12. After initializing program memory and performing diagnostics, communication device 12 loads NAMs 70–74 stored in EPROM 100 of memory 54 into program memory or volatile memory of transceiver 50 at step 302. Transceiver 50 may also load information contained in personality module 76 into program memory at this time.

Communication device 12 initiates registration procedures by selecting the first NAM for registration at step 304. For purposes of this discussion and to illustrate the various features of system 10, registration of NAM1–NAM4 proceeds in accordance with the information contained in table 102 shown in FIG. 2. Since autonomous registration is disabled for NAM1 at step 306, communication device 12 proceeds to select NAM2 at step 308. Communication device 12 disables autonomous registration of NAM1 since registration of this particular NAM is accomplished through a different procedure using network 14 and complex 18. In a particular embodiment, communication device 12 issues a present message, such as a feature request, to register NAM1 with network 14 and complex 18, which is a different procedure than that adopted by the EIA/TIA 553 and IS-41 autonomous registration protocol or contemplated by service providers that operate networks 14 and 16. With autonomous registration disabled for NAM1, system 10 eliminates any undesired registrations of NAM1 using other registration procedures.

For NAM2, autonomous registration is not disabled at step 306, so communication device 12 registers NAM2 using the normal EIA/TIA 553 and IS-41 or other appropriate registration procedure at step 310. If communication device 12 is currently located in Boston, communication device 12 may register NAM2 as a roamer on network 14 or 16. Communication device 12 can compare SID 202 of NAM2 with one or more SIDs identified in control channels of networks 14 and 16 to determine whether NAM2 registers locally or as a roamer.

Communication device 12 is not done registering NAMs at step 312 and selects NAM3 at step 308 for registration. If communication device 12 can match SID 202 (488) of NAM3 with a SID specified in the control channels, NAM3 registers as a local number on network 14 or 16 at step 310.

Auto registration is not disabled for NAM4 at step 306, so communication device 12 proceeds to register NAM4 at step 310. In a particular embodiment, communication device 12 employs specific logic to allow selective registration on either the A side or B side cellular service providers. Aspects of this registration procedure are explained in detail in U.S. Pat. No. 5,155,689 entitled "Vehicle Locating and Communicating Method and Apparatus" and U.S. Pat. No. 5,454,027 entitled "Phantom Mobile Identification Number Method and Apparatus," both patents being expressly incorporated herein by reference for all purposes. In summary, communication device 12 initially disables autonomous registration to gather information from the A side and B side cellular service providers. For example, communication device 12 may compare the received SID to an authorized or preferred table of SIDs stored in memory 54, and may also determine the associated signal strength for each provider. In response, communication device 12 selects the appropriate network for registration, and enables autonomous registration to register NAM4 at step 310.

Upon registration of all NAMs referenced in table 102 and loaded into program memory of transceiver 50, communication device 12 enters an idle mode by deactivating all NAMs at step 314. During this mode, communication device 12 determines if any condition occurs at step 316 to cause re-registration of the NAMs. Re-registration may be performed in response to loss of registration of at least one NAM by, for example, communication device 12 traveling outside of network coverage; in response to a challenge order or registration order from networks 14 and 16; or other condition. If communication device 12 determines to re-register one or more NAMs at step 316, the method proceeds to step 304 for registration. A return to step 304 contemplates registration of all or a portion of the NAMs supported by communication device 12, as needed. While in the idle state, communication device 12 monitors control channels of networks 14 and 16 for pages, orders, or other communication to be acted upon at step 318. If no messages are detected by communication device 12, the method loops back to step 316.

If communication device 12 detects a page, order, or other message from networks 14 and 16, the method proceeds to select the first NAM in table 102 at step 320. If the page does not correspond to the selected NAM at step 322 and all of the NAMs have not been selected at step 324, communication device 12 selects the next NAM at step 326 for matching.

Upon determining that the page matches a NAM in table 102 at step 322, communication device 12 enters a busy mode by activating the selecting NAM at step 330, as shown in FIG. 3B. In a particular embodiment in which communication device 12 does not include multiple channel capability, all attempted communication with communication device 12 using NAMs other than the activated NAM are disabled. Communication device 12 responds to the page or order at step 332, and if appropriate seizes a voice or data channel for communication at step 334. After providing communication at step 336, communication device 12 deactivates the activated NAM at step 338. If inbound communication is not complete at step 340, communication device 12 re-enters the idle state at step 316.

Figure 4:
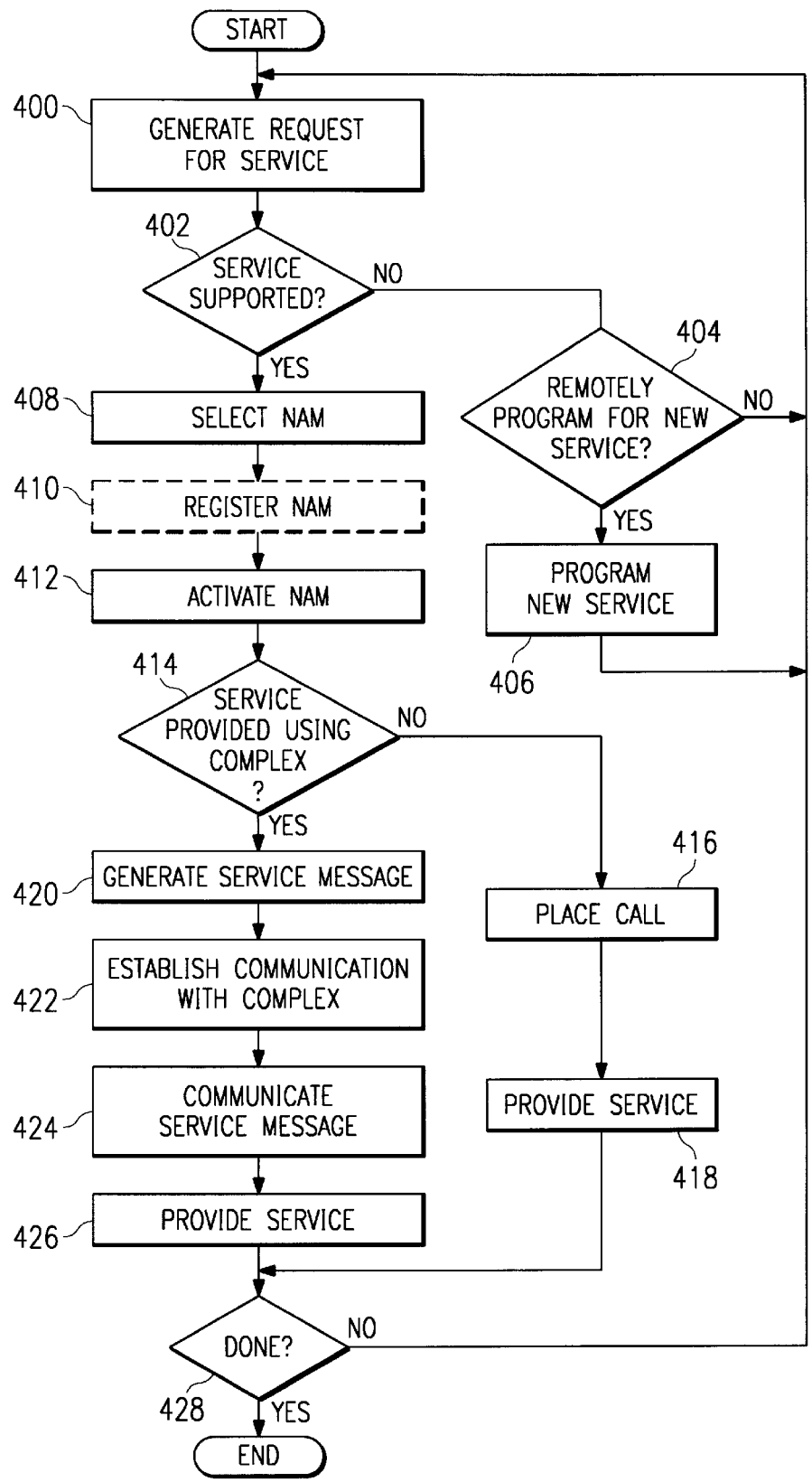
FIG. 4 is a flow chart of a method for outbound communication using the communication device of FIG. 1.

FIG. 4 is a flow chart of a method for outbound communication using communication device 12. Inbound communication illustrated in FIG. 3 and outbound communication illustrated in FIG. 4 may be performed concurrently, separately, or in cooperation depending on the specific embodiment and operation of communication device 12. For example, the power-up, registration, and idle procedures of communication device 12 illustrated in steps 300–318 of FIG. 3 may be performed before or while executing the method illustrated in FIG. 4. Alternatively, FIG. 4 may be executed without the registration procedures of FIG. 3.

Communication device 12 initiates outbound communication at step 400 by generating a request for service. This may be in response to a local or long distance number dialed on keypad 108, an activation of a selected service button 106 on handset 51 or input/output device 56, or by initiation of outbound communication from processor 52 or external devices 58 with or without operator intervention. For example, communication device 12 may support periodic, random, or on-demand reporting of position fixes, sensor readings, or other information from communication device 12 to complex 18 or enhanced service modules 20–28. The request for service may comprise the dialed numbers, activated service button, information generated for reporting, or any signal generated by communication device 12 in response to these activities. The request for service may be in any appropriate format to enable communication device 12 to relate the request for service to voice service identifiers 204 or enhanced service identifiers 206 maintained in table 102.

In response to the request for service, communication device 12 determines if the service is supported by accessing information maintained in table 102 stored in memory 54 at step 402. If communication device 12 does not support the service but desires remote programming for the new service at step 404, then communication device 12 may be programmed at step 406 in accordance with the method described below with reference to FIG. 5.

If communication device 12 supports the requested service at step 402, then communication device 12 selects the appropriate NAM at step 408 associated with the requested service. For example, communication device 12 may access the information in table 102 to associate the requested voice service identifier 204 or enhanced service identifier 206 with the appropriate NAM. If communication device 12 has not registered the selected NAM, for example, in accordance with the registration procedures described above with reference to FIG. 3, then communication device 12 registers the selected NAM at step 410. Communication device 12 may register the selected NAM as a local customer or roamer using the EIA/TIA 553 and IS-41 autonomous registration, other registration procedures supported by complex 18, or any other suitable registration procedure in accordance with the auto register identifier 208 associated with the selected NAM. Communication device 12 activates the selected NAM at step 412.

If the selected service may be provided without involving complex 18 at step 414, for example using network 16, then communication device 12 places a call at step 416 and provides the communication service at step 418. However, if the selected service uses complex 18 at step 414, then communication device 12 may generate service message 110 at step 420, which contains an identifier 112 for communication device 12, relevant data 114 such as position data, and a service identifier 116 associated with a selected voice or enhanced service. Communication device 12 establishes communication with complex 18 using network 14 at step 422, and communicates service message 110 to complex 18 at step 424. Using complex 18 and a selected enhanced service module 20–28, if appropriate, system 10 provides the selected service to communication device 12 at step 426. If communication device 12 is not done at step 428, the method proceeds to step 400 to process the next request for service.

Figure 5:
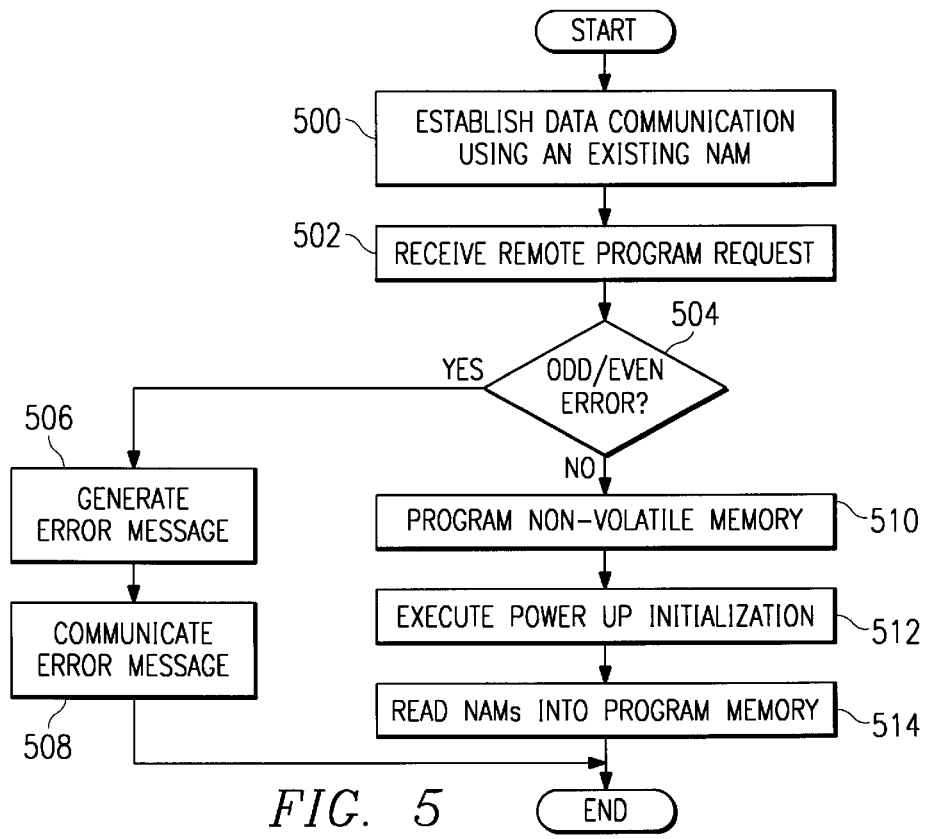
FIG. 5 is a flow chart of a method for remotely programming the communication device of FIG. 1.

FIG. 5 is a flow chart of a method for programming a new service, such as contemplated by step 406 in FIG. 4. The method begins at step 500 where communication device 12 establishes data communication using an existing NAM. This data communication may be in response to a request previously generated by communication device 12 for new service, or may be generated automatically by complex 18, enhanced service modules 20–28, or other device in system 10 to offer additional services to communication device 12. In a particular embodiment, the data communication may be initiated by a failed request for communication service as contemplated by steps 402–406 in FIG. 4. For example, the user of communication device 12 may enter a new area and attempt to place a local telephone call. If no local NAM exists in table 102, communication device 12 may automatically generate a request to be programmed with an additional NAM that supports local telephone service.

Communication device 12 receives a remote program request at step 502 using the data communication established at step 500. Remote program request comprises NAM information to add, delete, or modify information contained in table 102, NAMs 70–74, or personality module 76. A remote program request to add additional services may include information associated with NAM5 in entry 218. Remote program requests may also be formatted for modifying an existing entry in table 102, or may specify entries in table 102 for deletion.

In a particular embodiment, the last digit of MIN 200 associated with each NAM determines whether communication device 12 monitors the even or odd bit stream in control channels communicated from networks 14 and 16. In this embodiment, communication device 12 ensures that either all MINs have last digits that are even-numbered or all MINs have last digits that are odd-numbered at step 504. If the MIN to be programmed does not comply with this odd or even number convention, communication device 12 generates an error message at step 506 and communicates the error message to complex 18 at step 508.

If the remote program request passes the odd/even check at step 504, then communication device 12 programs its non-volatile memory, for example EPROM 100, in accordance with the contents of the remote program request at step 510. In a particular embodiment, remote program request specifies information contained in NAMs 70–74, but uses the same information in personality module 76 for all programmed NAMs. For the new programming to take effect, communication device 12 executes power-up initialization at step 512 and reads information on the programmed NAMs into the program memory of transceiver 50 at step 514. The same method of FIG. 5 may be repeated if communication device 12 receives another remote program request.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A communication device, comprising:

an input device operable to generate a request specifying one of an enhanced service and a voice service;

a memory operable to store a first number assignment module associated with the enhanced service and a second number assignment module associated with the voice service;

a processor coupled to the input device and operable to select the first number assignment module if the request specifies the enhanced service, the processor operable to select the second number assignment module if the request specifies the voice service; and a transceiver coupled to the memory and operable to provide the requested service using the selected number assignment module.

2. The communication device of claim 1, wherein the input device comprises a numeric telephone keypad, the input device operable to generate the request in response to a telephone number dialed on the keypad.

3. The communication device of claim 1, wherein the input device comprises a service button, the input device operable to generate the request in response to an activation of the service button.

4. The communication device of claim 1, wherein the input device comprises a display having a service button, the input device operable to generate the request in response to an activation of the service button representing a selection of a menu item on the display.

5. The communication device of claim 1, wherein the input device generates the request for communication service without operator intervention.

6. The communication device of claim 1, wherein the second number assignment module is associated with local telephone service.

7. The communication device of claim 1, wherein the first number assignment module is associated with an emergency service and the second number assignment module is associated with local telephone service.

8. The communication device of claim 1, wherein the memory further comprises a third number assignment module associated with long distance telephone service.

9. The communication device of claim 1, further comprising a sensor operable to communicate data to the transceiver, the data associated with the requested service.

10. The communication device of claim 1, further comprising an actuator operable to receive data from the transceiver, the data associated with the requested service.

11. The communication device of claim 1, wherein the processor is operable to modify at least one of the first number assignment module and the second number assignment module stored in memory in response to a remote program request.

12. A method of operation of a cellular transceiver having a first number assignment module and a second number assignment module, the first number assignment module associated with an enhanced service and the second number assignment module associated with a voice service, the method comprising:

generating at the cellular transceiver a request specifying one of the enhanced service and the voice service;

selecting the first number assignment module if the request specifies the enhanced service;

selecting the second number assignment module if the request specifies the voice service; and providing the requested service using the cellular transceiver and the selected number assignment module.

13. The method of claim 12, wherein the step of generating the request comprises generating the request in response to a dialed telephone number.

14. The method of claim 12, wherein the step of generating the request comprises generating the request in response to an activation of a service button.

15. The method of claim 12, wherein the step of generating the request comprises:

displaying a menu item on a display; and generating the request in response to an activation of a service button representing a selection of the menu item on the display.

16. The method of claim 12, wherein the second number assignment module is associated with local telephone service.

17. The method of claim 12, wherein the first number assignment module is associated with an emergency service and the second number assignment module is associated with local telephone service.

18. The method of claim 12, wherein the memory further comprises a third number assignment module associated with long distance telephone service and further comprising the step of selecting the third number assignment module if the request specifies long distance telephone service.

19. The method of claim 12, wherein providing the requested service comprises:

generating sensor data at a sensor coupled to the cellular transceiver, the sensor data associated with the requested service; and transmitting the sensor data using the cellular transceiver and the selected number assignment module.

20. The method of claim 12, wherein providing the requested service comprises:

receiving actuator data using the cellular transceiver and the selected number assignment module, the actuator data associated with the requested service; and communicating the actuator data to an actuator coupled to the cellular transceiver.

21. The method of claim 12, further comprising the step of modifying at least one of the first number assignment module and the second number assignment module in response to a remote program request.

22. A cellular communication system, comprising:

a communication device comprising a memory operable to store a first number assignment module associated with an enhanced service and a second number assignment module associated with a voice service;

a first cellular network coupled to the communication device, the first cellular network operable to register the first number assignment module; and a second cellular network coupled to the communication device, the second cellular network operable to register the second number assignment module such that the first number assignment module and the second number assignment module are concurrently registered with their respective cellular networks.

23. The system of claim 22, wherein the communication device further comprises a transceiver operable to transmit a service message to the first cellular network, the system further comprising a complex coupled to the first cellular network and operable to receive the service message, the complex further operable to provide the enhanced service to the communication device in response to the service message.

24. The system of claim 22, wherein the communication device further comprises a transceiver operable to transmit a service message to the first cellular network, the system further comprising:

a complex coupled to the first cellular network and operable to receive the service message; and an enhanced service module coupled to the complex and identified in the service message, the enhanced service module operable to provide the enhanced service to the communication device.

25. A cellular communication system, comprising:

a communication device comprising a memory operable to store a first number assignment module associated with a first class of service and a second number assignment module associated with a second class of service;

a first cellular network coupled to the communication device, the first cellular network operable to register the first number assignment module; and a second cellular network coupled to the communication device, the second cellular network operable to register the second number assignment module such that the first number assignment module and the second number assignment module are concurrently registered with their respective cellular networks.

26. The system of claim 25, wherein:

the first class of service directs outgoing calls to a complex; and the second class of service prohibits long distance calls.

27. A method for cellular communication in a first cellular network and a second cellular network, the method comprising:

storing a first number assignment module associated with an enhanced service and a second number assignment module associated with a voice service at a communication device;

registering the first number assignment module with the first cellular network; and registering the second number assignment module with the second cellular network such that the first number assignment module and the second number assignment module are concurrently registered with their respective cellular networks.

28. The method of claim 27, further comprising:

transmitting a service message to the first cellular network;

receiving the service message at a complex; and providing the enhanced service to the communication device in response to the service message.

29. The method of claim 27, further comprising:

transmitting a service message to the first cellular network;

receiving the service message at a complex;

selecting an enhanced service module; and providing the enhanced service to the communication device in response to the service message.

30. A method for cellular communication in a first cellular network and a second cellular network, the method comprising:

storing a first number assignment module associated with a first class of service and a second number assignment module associated with a second class of service at a communication device;

registering the first number assignment module with the first cellular network; and registering the second number assignment module with the second cellular network such that the first number assignment module and the second number assignment module are concurrently registered with their respective cellular networks.

31. The method of claim 30, wherein:

the first class of service directs outgoing calls to a complex; and the second class of service prohibits long distance calls.

32. A device for communicating with a first cellular network and a second cellular network, comprising:

a memory operable to store a first number assignment module associated with an enhanced service and a second number assignment module associated with a voice service;

a transceiver operable to register the first number assignment module with the first cellular network and the second number assignment module with the second cellular network such that the first number assignment module and the second number assignment module are concurrently registered with their respective cellular networks, the transceiver operable to receive a page; and a processor operable to activate for communication one of the first number assignment module and the second number assignment module, the activated number assignment module specified by the page.

33. The device of claim 32, wherein the second number assignment module is associated with local telephone service.

34. The device of claim 32, wherein the first number assignment module is associated with an emergency service and the second number assignment module is associated with local telephone service.

35. The device of claim 32, wherein the memory further stores a third number assignment module associated with long distance telephone service, the transceiver operable to register the third number assignment module with a third cellular network such that the first number assignment module, the second number assignment module, and the third number assignment module are concurrently registered with their respective cellular networks.

36. The device of claim 32, further comprising a sensor operable to communicate data to the transceiver for communication using the activated number assignment module.

37. The device of claim 32, further comprising an actuator operable to receive data from the transceiver using the activated number assignment module.

38. The device of claim 32, wherein the processor is operable to modify at least one of the first number assignment module and the second number assignment module stored in the memory in response to a remote program request.

39. A method performed at a communication device for communicating with a first cellular network and a second cellular network, the method comprising:

storing a first number assignment module associated with an enhanced service and a second number assignment module associated with a voice service in a memory;

registering the first number assignment module with the first cellular network and the second number assignment module with the second cellular network;

receiving a page identifying a selected one of the first number assignment module and the second number assignment module; and activating for communication the selected number assignment module.

40. The method of claim 39, wherein the second number assignment module is associated with local telephone service.

41. The method of claim 39, wherein the first number assignment module is associated with an emergency service and the second number assignment module is associated with local telephone service.

42. The method of claim 39, further comprising:

generating sensor data at a sensor coupled to the communication device; and transmitting the sensor data using the selected number assignment module.

43. The method of claim 39, further comprising:

receiving actuator data using the selected number assignment module; and communicating the actuator data to an actuator coupled to the communication device.

44. The method of claim 39, wherein the memory is operable to modify at least one of the first number assignment module and the second number assignment module in response to a remote program request.

45. The method of claim 39, further comprising:

responding to the page using the selected number assignment module;

providing communication using the selected number assignment module; and deactivating the selected number assignment module after providing communication.

46. A method for remotely programming a communication device, comprising:

establishing data communication with a first cellular network;

receiving a remote program request, the remote program request specifying number assignment module information; and programming a memory of the communication device with the number assignment module information such that the communication device is operable to receive enhanced service using a first cellular network and voice service using a second cellular network.

47. The method of claim 46, wherein the remote program request comprises:

a new mobile identification number to be supported by the communication device; and a new system identification number associated with the new mobile identification number and a second cellular network.

48. The method of claim 46, further comprising the step of reading the number assignment module information into a program memory of the communication device.

49. The method of claim 46, further comprising the step of reading the number assignment module information into a program memory of the communication device during power-up initialization of the communication device.

50. The method of claim 46, further comprising the step of comparing a mobile identification number specified in the remote program request to determine if the mobile identification number is compatible with an existing mobile identification number supported by the communication device.

51. A method for remotely programming a communication device, comprising:

establishing data communication with a first cellular network;

receiving a remote program request, the remote program request specifying number assignment module information;

reading a last digit of a mobile identification number specified in the remote program request;

determining whether the last digit is odd or even;

generating an error message in response to the determination; and programming a memory of the communication device with the number assignment module information.

* * * * *